United States Patent
Pedersen et al.

(10) Patent No.: US 7,891,710 B2
(45) Date of Patent: Feb. 22, 2011

(54) CONNECTOR WITH RELEASE MECHANISM, AND METHOD FOR FORMING A RELEASABLE FLUID CONNECTION

(75) Inventors: Egil Pedersen, Raufoss (NO); Kristoffer Dale, Lillehammer (NO); Jan E. Sangro, Hamar (NO)

(73) Assignee: Kongsberg Automotive AS, Kongsberg (NO)

( * ) Notice: Subject to any disclaimer, the term of this patent is extended or adjusted under 35 U.S.C. 154(b) by 742 days.

(21) Appl. No.: 10/587,597

(22) PCT Filed: Jan. 28, 2005

(86) PCT No.: PCT/NO2005/000034

§ 371 (c)(1),
(2), (4) Date: Sep. 5, 2007

(87) PCT Pub. No.: WO2005/073613

PCT Pub. Date: Aug. 11, 2005

(65) Prior Publication Data

US 2008/0111374 A1   May 15, 2008

(30) Foreign Application Priority Data

Jan. 30, 2004   (NO) .................................. 20040441

(51) Int. Cl.
   *F16L 37/084* (2006.01)
(52) U.S. Cl. ......................................... 285/319; 285/39
(58) Field of Classification Search ................. 285/319, 285/1, 39, 308; 403/329, DIG. 4
See application file for complete search history.

(56) References Cited

U.S. PATENT DOCUMENTS

| | | | |
|---|---|---|---|
| 4,035,005 A | | 7/1977 | DeVincent et al. |
| 4,836,580 A | * | 6/1989 | Farrell .......................... 285/24 |
| 4,923,227 A | * | 5/1990 | Petty et al. .................. 285/319 |
| 4,989,905 A | * | 2/1991 | Rajecki ....................... 285/319 |
| 5,031,266 A | * | 7/1991 | Tillman et al. ............. 15/327.2 |
| 5,048,874 A | | 9/1991 | Ohlsson |
| 5,087,084 A | * | 2/1992 | Gehring ....................... 285/319 |
| 5,094,482 A | * | 3/1992 | Petty et al. .................. 285/319 |
| 5,112,086 A | * | 5/1992 | Gruber et al. ................. 285/86 |
| 5,150,930 A | * | 9/1992 | Petty et al. .................. 285/319 |
| 5,511,827 A | * | 4/1996 | Steinkamp et al. ............ 285/39 |

(Continued)

FOREIGN PATENT DOCUMENTS

EP          414500 A1  *  2/1991

(Continued)

*Primary Examiner*—James M Hewitt
(74) *Attorney, Agent, or Firm*—Steven M. Jensen; Edwards Angell Palmer & Dodge LLP

(57) ABSTRACT

A connector for use in a system for flowing fluid, having at least one cup-shaped female part, in which an adapted male part on another connector is intended to be sealingly and securely mounted, wherein the female part has integral longitudinal locking tangs which have their free ends pointing in the direction of insertion of a male part into the female part, the free ends of the locking tangs projecting into the space in the female part for engaging with a male part, and wherein the locking tangs have at least one recess which can be used by a tool to urge the locking tangs apart so that the male part and the female part can be disengaged from one another.

24 Claims, 2 Drawing Sheets

U.S. PATENT DOCUMENTS

| | | | |
|---|---|---|---|
| 5,568,946 A * | 10/1996 | Jackowski | 285/38 |
| 5,988,704 A | 11/1999 | Ryhman | |
| 5,992,895 A * | 11/1999 | Steinkamp | 285/45 |
| 6,173,998 B1 | 1/2001 | Bock | |
| 6,536,807 B1 * | 3/2003 | Raymond et al. | 285/93 |
| 6,612,622 B2 * | 9/2003 | Andre et al. | 285/305 |
| 7,458,619 B2 * | 12/2008 | Cassel et al. | 285/420 |
| 7,695,020 B2 * | 4/2010 | Schmidt | 285/91 |
| 2002/0093194 A1 * | 7/2002 | Lacroix et al. | 285/80 |
| 2002/0096883 A1 * | 7/2002 | Youssefifar | 285/319 |
| 2003/0062722 A1 * | 4/2003 | Linhart | 285/319 |
| 2003/0127856 A1 * | 7/2003 | Youssefifar | 285/319 |
| 2003/0146622 A1 * | 8/2003 | Youssefifar | 285/305 |
| 2005/0134041 A1 * | 6/2005 | Kikumori et al. | 285/319 |
| 2005/0258646 A1 * | 11/2005 | Gunderson | 285/319 |
| 2006/0022461 A1 * | 2/2006 | Hull et al. | 285/319 |
| 2006/0145475 A1 * | 7/2006 | Walker et al. | 285/319 |
| 2006/0208485 A1 * | 9/2006 | Discher et al. | 285/319 |
| 2007/0040378 A1 * | 2/2007 | Sheppard et al. | 285/319 |
| 2007/0246936 A1 * | 10/2007 | Jeltsch | 285/319 |
| 2009/0256355 A1 * | 10/2009 | Wicks et al. | 285/319 |

FOREIGN PATENT DOCUMENTS

| | | |
|---|---|---|
| EP | 1 333 217 A2 | 8/2003 |
| GB | 2227292 A * | 7/1990 |
| WO | WO 96/24003 | 8/1996 |

* cited by examiner

CONNECTOR WITH RELEASE MECHANISM, AND METHOD FOR FORMING A RELEASABLE FLUID CONNECTION

FIELD OF THE INVENTION

The present invention relates to a connector for use in a system for flowing fluids, having at least one cup-shaped female part, in which an adapted male part on another connector is intended to be sealingly and securely mounted. In particular, the invention relates to a release mechanism for the said connector which disengages a male part from a female part.

BACKGROUND OF THE INVENTION

In known solutions for locking systems for a male part and a female part, the locking element is often a separate ring. The ring may be located on either the male part or the female part, whilst the other part comprises a locking groove. The ring is compressed or expanded as the male part is passed into the female part, before it slips into place in the locking groove.

For example, air brake systems on commercial goods vehicles use connectors with nipples for the pipes, the connectors being made with male parts for connecting them to openings in female parts on another connector in a sealing manner. The nipples may have external, circumferential grooves onto which the pipes are pressed and secured. Opposite the nipples, the connector may have a male part with sealing elements and locking rings that are to secure the connectors in female parts which have internal locking ring grooves. A common type of locking ring is a split ring, optionally with a bevelled outer edge for facilitating insertion into the female part. As sealing elements it is usual to use O-rings, which can be stretched to be passed into the male parts and fitted in the annular grooves therein, or which are inserted into the female parts and located in internal grooves therein.

Thus, the locking rings are separate parts, which are mounted in the male parts or in the female parts before these parts are connected together.

Connectors of this type have long been made of metal, especially of brass, and the method of production has been turning. For reasons of price, it has been desirable to manufacture the connectors by injection moulding plastic in order to reduce material costs and to avoid machining. Moreover, it is also desirable to avoid separate locking rings.

A prerequisite for rational moulding is that the mould parts used, including the core which forms the inner space in the female part, should be capable of being used for a large number of connectors, and consequently the connectors must releasable from the mould parts without the mould parts having to be destroyed.

Furthermore, in many uses it is necessary to have the possibility of disconnecting the male part from the female part. For this purpose, it especially desirable to have a durable, good connection which can easily be disengaged using a suitable tool which is usually at hand in a workshop situation.

GB Patent No. 1521448 teaches a split coupling sleeve formed by punching and bending sheet metal so that the sleeve comprises four longitudinal wall portions separated by slits and a bottom having a hole for a tube. The sleeve is fitted on the outside of the tube, which is made having an external, circumferential locking bead against which an end of the sleeve comes to rest. At the opposite end, the sleeve has interior locking tangs which project obliquely into the sleeve. The locking tangs are attached to the rest of the sleeve close to the opposite end, and the free ends of the locking tangs point in the direction of insertion of a male part that is insertable into the sleeve. The male part is made having a collar which is locked by the locking tangs after having passed them, in that the free ends of the locking tangs remain resting against a transverse edge that delimits the collar. Thus, the sleeve is open in the slits between the four wall portions, and cannot contribute to the formation of a seal for a flowing medium. The sleeve has a solely mechanical function. Sealing is therefore formed between the tube and the male part. The sleeve is not suitable for moulding.

U.S. Pat. No. 5,988,704 teaches a coupling where a female part has locking tangs which can lock against an inserted male part. The female part is formed of several components, namely an outer sleeve of metal, a non-metallic tubular piece on which the sleeve is fitted and an inner sleeve of metal in which the locking tangs are formed, whilst the male part has transverse edges that come to rest against the ends of the locking tangs after insertion of the male part. A sealing ring is inserted in an annular groove in the sleeve.

U.S. Pat. No. 5,048,874 also teaches a coupling where a female part has inner locking tangs angled in the direction of insertion of a male part. The male part has a circumferential edge against which the ends of the locking tangs come to rest after insertion of the male part. The locking tangs are located on an inserted member in the female part, introduced into an elongate annular groove therein.

EP 1 333 217 also describes a coupling sleeve which can be made having integral locking tangs, and which in addition is equipped with an extra spring element for improving the resilience of the locking tangs.

Moreover, WO 96/24003 discloses a coupling sleeve having longitudinal integral locking tangs pointing towards the direction of insertion of a connecting member. The sleeve may contain a sealing element.

SUMMARY OF THE INVENTION

The present invention provides a connector which, in an integral female part, has integral locking tangs, and which can be moulded, thereby avoiding the use of a separate locking ring or a separate locking tang element. The free ends of the locking tangs point in the direction of insertion of a male part into the female part. The locking tangs may be directed obliquely inwards in the female part, or each locking tang may have an inwardly facing catch on its free end, so that the locking tangs are bent resiliently outwards when the male part is inserted, and then engage with at least one shoulder or flange on the male part. The male part may have two shoulders or flanges one after the other, so that the outermost one provides a safety position in the event that the engagement with the innermost shoulder or flange ceases.

The manufacture is rational as there is no need for the manufacture and assembly of separate locking rings or separate locking tang parts. Moreover, the danger of missing or incorrectly mounted locking rings or locking tangs is avoided.

Under load, when there is internal pressure in the system of which the female part is a component, which seeks to force the female part and the male part apart axially, the locking tangs will be subjected to compressive strain in the longitudinal direction.

Thus, according to the present invention there is provided a connector for use in a system for flowing fluid, having at least one cup-shaped female part, in which an adapted male part on another connector is intended to be sealingly and securely mounted, wherein the female part has integral, longitudinal locking tangs which have their free ends pointing in the direction of insertion of a male part into the female part, the free ends of the locking tangs projecting into the space in the female part for engagement with a male part, and wherein the locking tangs have engaging means that can be used by a tool to urge the locking tangs apart so that the male part and the female part can be disengaged from one another.

The engaging means may be recesses of various kinds such as holes which are wholly or partly through-going. The recesses or holes are preferably provided in the transverse direction of the direction of movement of the locking tangs upon disengagement, or at a suitable angle relative to the longitudinal direction so that a tool can grip the recesses to pull or urge the locking tangs apart. The recesses may have various cross-sectional configurations such as circular, oval, square etc. adapted to the tool or tools that are to be used to disengage the connection between the male and the female part. The engaging means may also be projections or lugs so arranged as to allow a tool to engage the lugs and with the aid thereof urge the locking tangs apart in accordance with the invention.

In a preferred embodiment, at least one of or each of the locking tangs has at least one hole in the transverse direction of the connector, whereby two locking tangs with mutually parallel holes on the same side of the connector can be urged apart using a tool, e.g., pliers of the type for use on Seeger rings.

In different embodiments, there may be a smooth portion formed on the locking tongues and a corresponding smooth portion formed on the connector, which portions together form a position indicator in that when a male part has been inserted correctly, they are in the same radial position, whilst on incorrect insertion of the male portion, the flat portion on the locking tangs will be displaced radially outwards by a shoulder on the male part, and the displacement makes it possible to feel a difference in height between the smooth portions, which thus indicates an incorrect or incomplete mounting.

Furthermore, the female part according to the invention may be designed and dimensioned to act as an impact protector for a connector on which the male part is located.

The female part may also be in one piece with at least one corresponding female part, forming an in-line connector, an elbow, a tee or a cross. The female part may also be in one piece with a nipple or several nipples for the mounting of one or more pipes or hoses.

Thus, a connector according to the invention may have different types of transition to other parts of the system. The connector, on the end opposite the end provided with the locking tangs, may be made with external threads, or it can be made as a nipple for the mounting of a pipe. The female part may be in one piece with a corresponding female part for insertion of a second male part, or in one piece with two or more corresponding female parts to form a tee with three female parts or a cross with four female parts, for insertion of respectively three and four male parts. There is no limit whatsoever as regards the design of the connector opposite the end with the locking tangs, except that through-flow must be facilitated.

BRIEF DESCRIPTION OF THE DRAWINGS

The present invention will be better understood from the following detailed description and the attached drawings, which are only an illustration and which are thus not limiting for the invention.

Like reference numerals refer to like parts.

DETAILED DESCRIPTION OF THE INVENTION

Figure 1:
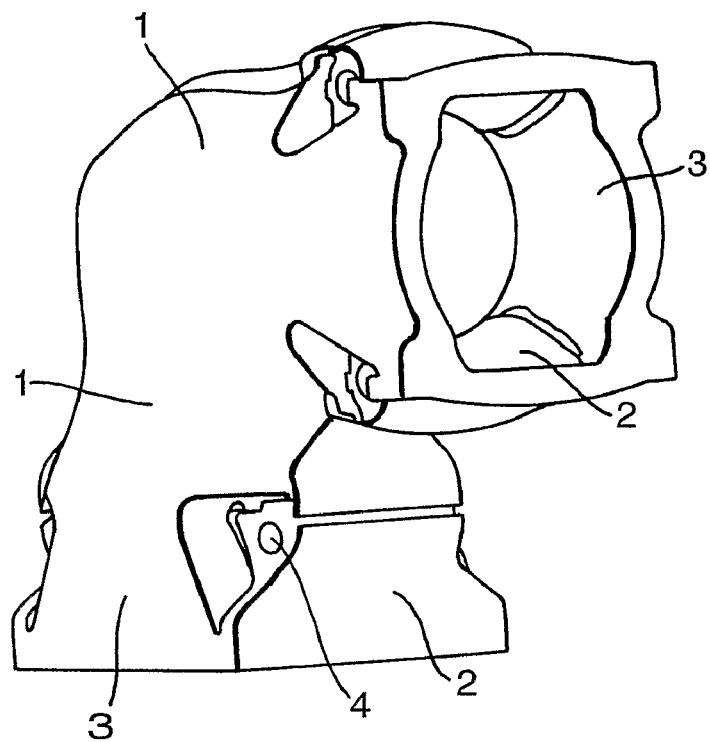
FIG. 1 is a perspective view of a connector with two female parts at right angles to each other.
Figure 2:
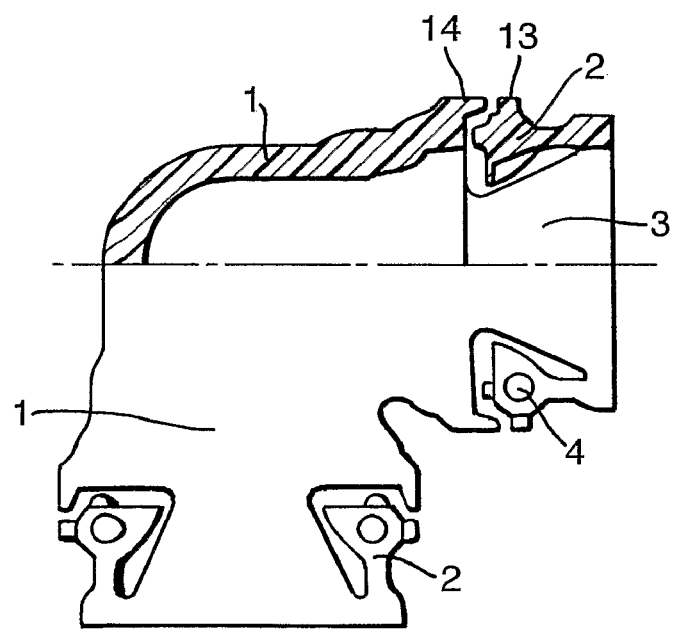
FIG. 2 is a partial section of FIG. 1.

FIGS. 1 and 2 are perspective views of an example of the present invention in the form of a connector comprising two cup-shaped female parts 1 at right angles to each other, each female part 1 being equipped with locking tangs 2 which can engage with a groove or a flange on a male part that is inserted into the female part. The locking tangs 2 are integral parts of the walls 3 of the female part 1 and point in the direction of insertion of a male part, and the locking abutment for a flange on the male part is on the free ends of the locking tangs 2. The locking tangs 2 in the female part 1 may be made having holes 4. For disconnection of the male part from the female part, a tool can be passed into these hole 4 to urge the tangs 2 outwards in order to disengage the male part from the female part in that the groove edge or flange is no longer in abutment against the ends of the locking tangs 2. A tool of the type used for Seeger rings, e.g., may be used to pull the locking tangs 2 slightly outwards. Alternatively, a tool can grip under or on the lugs 15 in order to move the locking tangs 2 apart so as to disengage the connection. The lugs may alternatively also be located at other points on the locking tangs.

Two female parts 1 may also be joined to form an in-line connector for connecting together hoses and pipes, three female parts 1 may be joined to form a tee, or four female parts 1 may be joined to form a cross, for the insertion of a corresponding number of male parts. The connector may also comprise a nipple, optionally several nipples, for mounting one or more pipes, or it may comprise a threaded pipe section for connection to other parts of the system.

The female part 1 may be designed so that it forms an impact protector for the male part. This may be accomplished by the wall 3 of the female part 1 projecting so far in the axial direction that it covers the male part. The female part 1 is dimensioned according to what type of forces the male part may be subjected to.

Figure 3:
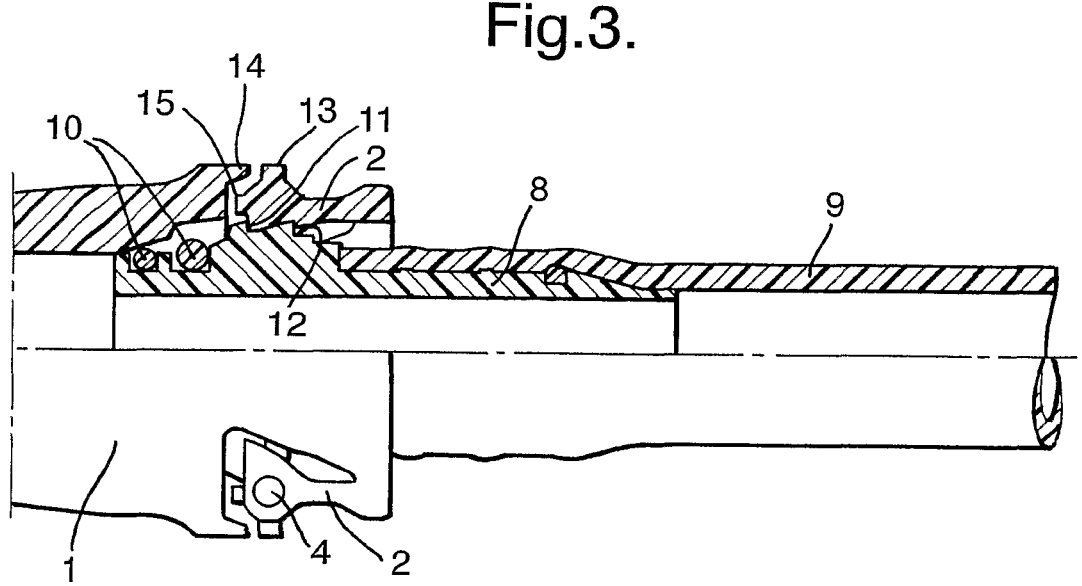
FIG. 3 is a axial section of a male part and a female part that are not fully connected to each other, i.e., in the safety position as described above.
Figure 4:
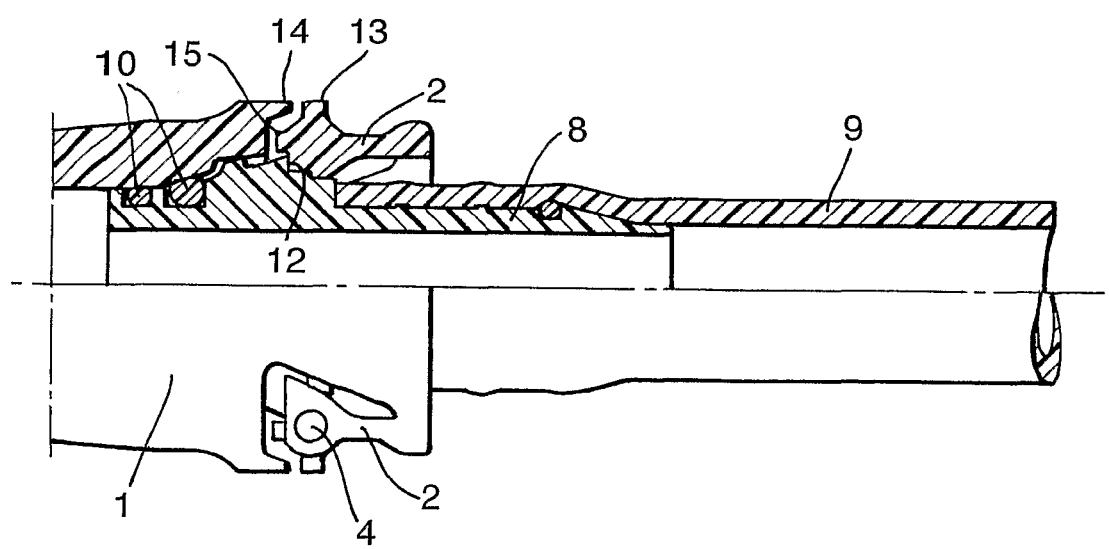
FIG. 4 is an axial section of a male part and a female part that are fully connected, the male part being made having a nipple into which a pipe has been passed.

FIGS. 3 and 4 show a male part 8, with an attached hose 9 and sealing rings 10, connected to a female part 1. The female part 1 is only partially shown in these figures as the end of the female part opposite the locking tangs 2 may be designed in many different ways, including those mentioned above in connection with FIGS. 1 and 2. The male part 8 in the illustrated example has two shoulders 11 and 12 which can engage with the ends of the flexible locking tangs 2 in the female part 1. Alternatively, the male part 8 may have grooves with which the locking tangs 2 engage. As shown in FIGS. 1 and 2, the locking tangs have holes 4 for a tool.

The connection of the male part 8 and the female part 1 may be done in two steps. The first step entails the parts engaging each other and being locked, without the O-rings 10 being compressed. This is done by the locking tangs 2 engaging with the shoulder 11 on the male part 8, as shown in FIG. 3. When there is a pressurised fluid within the connectors, it will result in controlled leakage which can be used to indicate incomplete mounting. The second step comprises the parts being completely mounted. The locking tangs 2 engage with the shoulder 12 on the male part 8, whilst the O-rings 10 are compressed and prevent leakage. At the same time the male part comes into controlled abutment within the connector.

Each locking tang 2 has on its exterior a smooth portion 13 close to its free end, whilst an adjacent area of the rest of connector has a corresponding smooth portion 14. These portions 13 and 14 are identical to each other, and may, e.g., be flat or curved, and together form a position indicator in that when the male part 8 has been correctly inserted in the second step, they are in the same radial position. When the male part 8 is incorrectly inserted, the smooth portion 13 on the locking tangs 2 will be displaced radially outwards because the shoulder 12 on the male part 8 has not passed through the locking tangs 2, but presses them outwards. The displacement makes it possible to feel a certain difference in height between the smooth portions 13 and 14, which thus indicates an incorrect mounting.

The connector according to the invention can be made of several types of plastic.

The flowing fluid can in principle be any liquid or gas.

The invention claimed is:

1. A pipe connector, comprising:
   at least one female pipe part for forming a sealing connection with at least one male pipe part; and
   a plurality of locking tangs formed in the female part for engaging the male part, each of the locking tangs having at least one recess configured for receiving a tool to disengage the connection between the male and female parts,
   wherein a longitudinal axis running through a center of the at least one recess extends transversely to a direction of movement of the locking tangs upon disengagement of the male and female parts.

2. The connector of claim 1, wherein the recess comprises a hole extending at least partially through the corresponding locking tang.

3. The connector of claim 1, wherein the recess comprises a hole extending completely through the corresponding locking tang.

4. The connector of claim 1, wherein at least two of the locking tangs have the recesses for receiving the tool to urge apart the locking tangs.

5. The connector of claim 4, wherein the tool is inserted into the recess of each of the two locking tangs to disengage the connection between the male and female parts.

6. The connector of claim 1, wherein the male part includes at least one shoulder for engaging the locking tangs.

7. The connector of claim 1, wherein the male part includes at least one groove for engaging the locking tangs.

8. The connector of claim 1, wherein the plurality of locking tangs are formed integrally with the female part.

9. The connector of claim 1, wherein the locking tangs have free ends pointing in a direction of insertion of the male part into the female part.

10. The connector of claim 9, wherein the free ends of the locking tangs project into a space in the female part for engagement with the male part.

11. The connector of claim 1, wherein each of the locking tangs has a smooth portion, and another smooth portion is formed on the female part, such that the smooth portions together form a position indicator indicating whether the male part is properly inserted into the female part.

12. The connector of claim 11, wherein upon proper insertion of the male part into the female part, the smooth portions are in the same radial position, whereas upon improper insertion of the male part into the female part, the smooth portion of each locking tang is displaced radially outwardly of the male part.

13. The connector of claim 1, wherein the connector includes a plurality of female parts selected from the group consisting of an in-line connector, an elbow, a tee, and a cross.

14. The connector of claim 1, wherein the female part includes at least one nipple for mounting at least one pipe or hose.

15. The connector of claim 1, wherein at least one fluid flows through the male and female parts.

16. A pipe connector for forming a sealing connection, comprising:
   a plurality of locking tangs formed in a female pipe part for engaging a male pipe part, each of the locking tangs having at least one recess configured for receiving a tool to disengage the connection between the male and female parts,
   wherein a longitudinal axis running through a center of the at least one recess extends transversely to a direction of movement of the locking tangs upon disengagement of the male and female parts.

17. The connector of claim 16, wherein the recess comprises a hole extending at least partially through the corresponding locking tang.

18. The connector of claim 16, wherein at least two of the locking tangs each have the at least one recess for receiving the tool to urge apart the locking tangs.

19. The connector of claim 18, wherein the tool is inserted into the at least one recess of each of the two locking tangs to disengage the connection between the male and female parts.

20. The connector of claim 16, wherein the locking tangs further include a projection or lug.

21. A method for forming a releasable connection between at least one female pipe part and at least one male pipe part, comprising the steps of:
   forming a plurality of locking tangs in the female part, each of the locking tangs having at least one recess configured for receiving a tool to disengage the connection between the male and female parts, wherein a longitudinal axis running through a center of the at least one recess extends transversely to a direction of movement of the locking tangs upon disengagement of the male and female parts; and
   engaging the locking tangs with the male part.

22. The method of claim 21, wherein the male part is formed with at least one first shoulder and at least one second shoulder, and the female part includes at least one O-ring.

23. The method of claim 22, wherein the step of engaging the locking tangs with the male part comprises the steps of:
   engaging the locking tangs with the at least one first shoulder of the male part; and
   engaging the locking tangs with the at least one second shoulder of the male part such that the at least one O-ring of the female part becomes compressed.

24. The method of claim 21, further comprising the step of:
   inserting the tool into the recesses of two of the locking tangs to urge apart the locking tangs and disengage the connection between the male and female parts.

* * * * *